United States Patent [19]

Taylor

[11] 4,395,006
[45] Jul. 26, 1983

[54] MECHANISM FOR CAPTURING AND RELEASING A SPINNING OBJECT

[76] Inventor: Henry J. Taylor, Willowdale, Ontario, Canada

[21] Appl. No.: 237,820

[22] Filed: Feb. 25, 1981

Related U.S. Application Data

[63] Continuation-in-part of Ser. No. 13,379, Feb. 21, 1974, abandoned.

[51] Int. Cl.³ .............................................. B64G 1/64
[52] U.S. Cl. ................................................... 244/161
[58] Field of Search ...................... 244/158, 159, 161; 188/71.1

[56] References Cited

U.S. PATENT DOCUMENTS

| | | | |
|---|---|---|---|
| 3,401,903 | 9/1968 | Bohr | 244/162 |
| 3,465,986 | 9/1969 | Milly | 244/158 |
| 4,079,904 | 3/1978 | Graskopfs et al. | 244/158 |
| 4,099,601 | 7/1978 | Pittman | 188/71.1 |
| 4,105,241 | 8/1978 | Mee | 244/161 |
| 4,129,200 | 12/1978 | Johannesen | 188/71.1 |
| 4,173,324 | 11/1979 | Rudmann | 244/161 |
| 4,219,171 | 8/1980 | Rudmann | 244/161 |

*Primary Examiner*—Charles E. Frankfort
*Attorney, Agent, or Firm*—Fetherstonhaugh & Co.

[57] ABSTRACT

A mechanism for capturing and releasing a spinning object comprises an adaptor housing which has a passive turntable mounted thereon and a braking clamp which is carried by a suitable support structure. The passive turntable is mounted on the adaptor so as to be free to rotate about the axis of rotation of the spinning object. The braking clamp initially engages the passive turntable and thereafter applies a braking torque to the adaptor housing.

14 Claims, 5 Drawing Figures

MECHANISM FOR CAPTURING AND RELEASING A SPINNING OBJECT

RELATED APPLICATIONS

This application is a continuation-in-part of application No. 13,379 filed Feb. 21, 1974 and now abandoned.

FIELD OF INVENTION

This invention relates to an end effector for use in the release and capture of a spinning space satellite.

PRIOR ART

In order to service orbiting satellites from a shuttle craft or the like, it is necessary to provide a mechanism capable of capturing an orbiting satellite and releasing a satellite into orbit. Many satellites rotate about a predetermined satellite axis when in orbit and thus the mechanism used for capture and release must have the ability to bring the rotation of the satellite to a halt on capture and to impart a rotation of the satellite when released. The act of capturing and releasing a satellite takes place in a hostile environment and must be affected by a remote manipulator. The mechanism of the present invention is designed to provide for the effective capturing, braking, spinning and release of a satellite as required in use.

SUMMARY OF INVENTION

According to one aspect of the present invention there is provided in combination, an end effector and a satellite adaptor for use in releasably securing and braking an object which is rotating about a first axis, said adaptor comprising; an adaptor housing having an inner end and an outer end and an adaptor axis extending between the inner end and the outer end, said adaptor housing being adapted to be secured at its inner end to said object with its adaptor axis aligned with said first axis, a passive turntable mounted at the outer end of said housing to permit relative rotation between said housing and said turntable about said adaptor axis, said end effector comprising; clamping means for releasably engaging said passive turntable to prevent rotation thereof while permitting rotation of said housing and brake means carried by said clamping means for applying a braking torque to said housing after said turntable is secured by said clamping means.

According to a further aspect of the present invention there is provided in combination an end effector and adaptor for use in releasably securing a satellite with respect to a manipulator arm of a service craft during servicing of orbiting space satellites which rotate about a satellite axis in use, said adaptor comprising; a housing having an inner end and an outer end and an adaptor axis extending between the inner end and the outer end, a spinner passage opening into said housing at the outer end thereof, said spinner passage being axially aligned with said adaptor axis, a brake disc at the outer end of said housing projecting radially outwardly from said spinner passage, a turntable mounted at the outer end of said housing for free rotation about said adaptor axis, said turntable having oppositely disposed first and second turntable clamping faces projecting radially from said adaptor axis and said end effector comprising; a first clamping arm having a proximal end and a distal end, a longitudinal axis extending from the proximal end to the distal end, a first clamping face at the distal end, and disposed in a first plane which is substantially parallel to said longitudinal axis so as to be locatable in a face-to-face relationship with said first turntable clamping force, a spin-up drive means mounted on said first clamping arm, said spin-up drive means comprising a spin-up drive shaft having a spin-up axis of rotation extending perpendicular to said first clamping face and said longitudinal axis, said spin-up drive means including means for driving said spin-up shaft axially along said spin-up axis between a retracted position disposed below said first clamping plane and an extended position projecting above said first clamping plane for engagement with said spinner passage of an adaptor in use and means for rotatably driving said spin-up shaft about said spin-up axis to rotatably drive said adaptor and its associated satellite in use, clamp actuator means having a first end and a second end and means for moving said first end and second end toward and away from one another, said first end being mounted on said first clamping arm between said first clamping face and the proximal end thereof, a pair of second clamping arms each having a proximal end and a distal end, a second clamping face at the distal end of each of said second clamping arms, the proximal ends of the second clamping arms being mounted on said second end of said clamp actuator means, one on either side of said longitudinal axis, for rotation about third axes which extend perpendicular to said clamping face, said second clamping arm being movable about said third axis between a first position in which the second clamping face of each second arm is disposed opposite said first clamping face to a second position in which said second arms are remote from said first clamping face, said clamp actuator means being operable to move said second clamping arms relative to said first clamping arms to move said second clamping faces toward and away from said first clamping face to clamp or release said turntable as required in use, retractable brake pad means on said first clamping arm at said clamping face, said brake pad means being retractable below said first clamping face and extendable above said first clamping face to engage said brake disc and apply a braking torque thereto in use.

The invention will be more clearly understood after reference to the following detailed specification read in conjunction with the drawings wherein.

Figure 1:
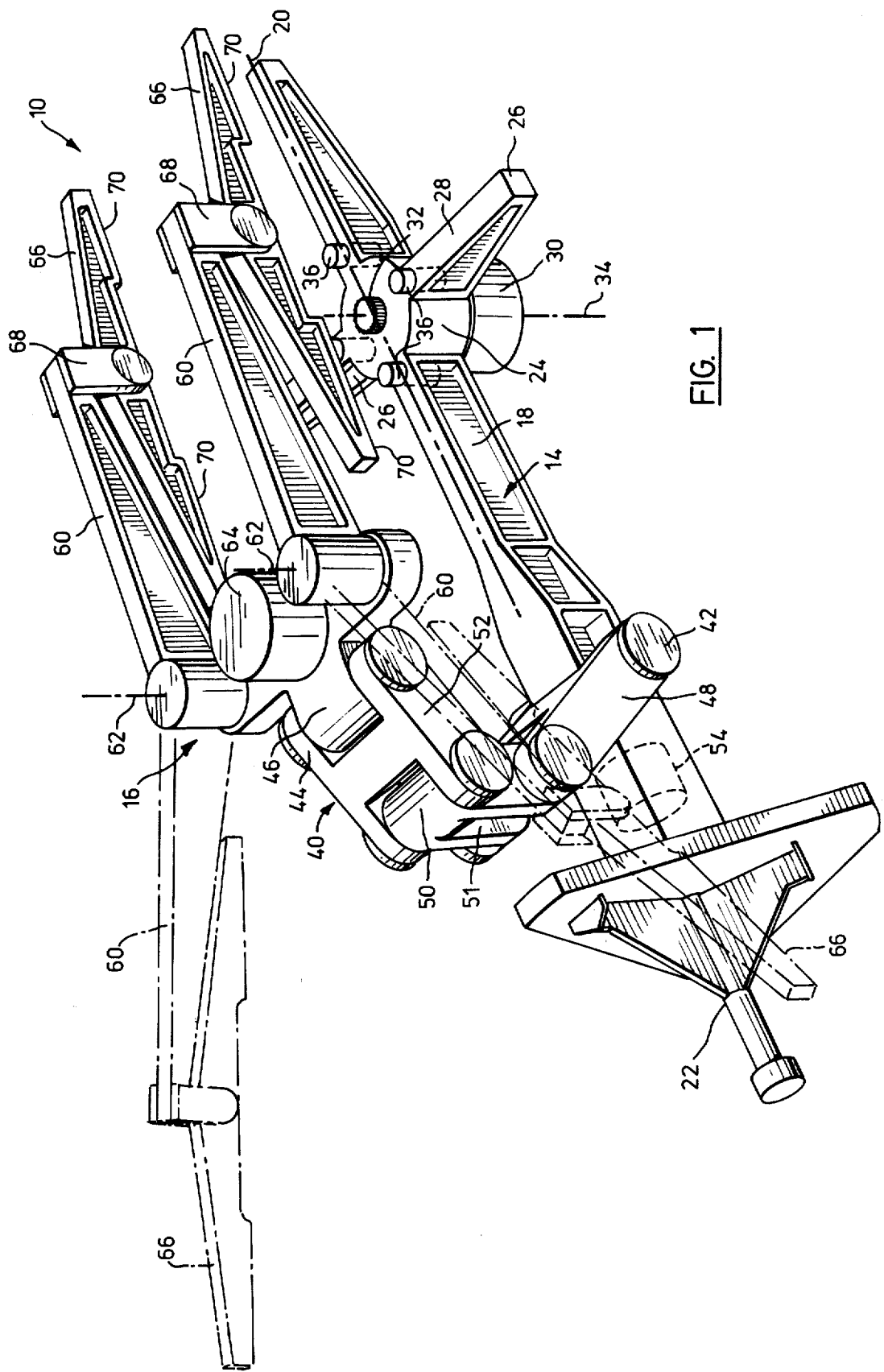
FIG. 1 is a pictorial view of an end effector constructed in accordance with an embodiment of the present invention.

With reference to the drawings, the reference numeral 10 (FIG. 1) refers generally to an end effector which may be releasably secured to the end of a manipulator arm for use in the capture and release of an adaptor 12 (FIG. 2) which is secured with respect to the satellite.

Figure 3:
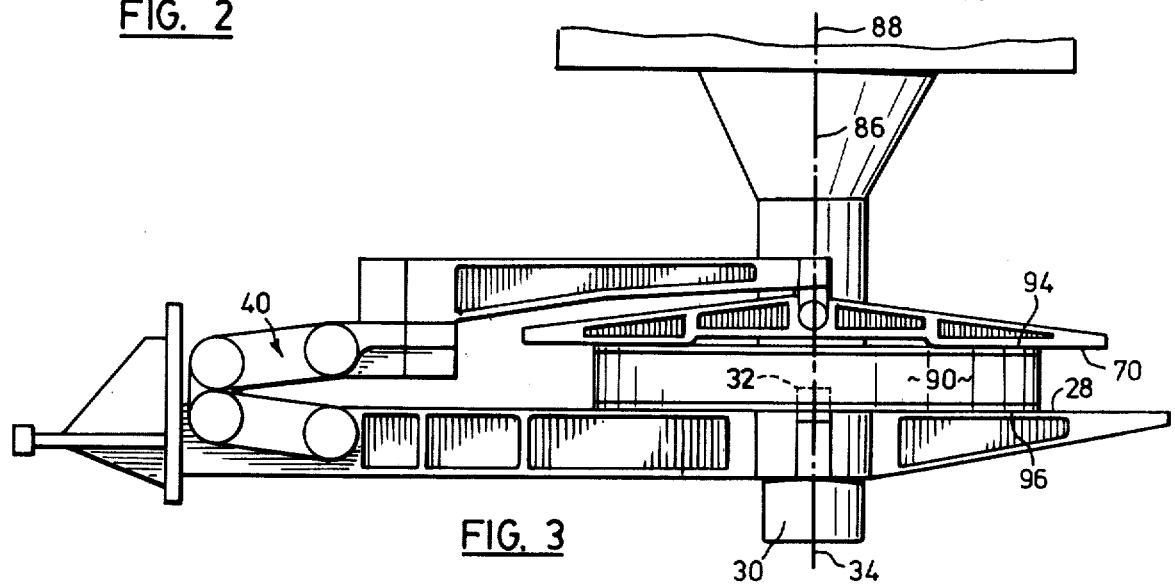
FIG. 3 is a partially section side view of the end effector and adaptor located in the satellite capture configuration.

With reference to FIG. 1 of the drawings, it will be seen that the end effector 10 includes a first clamping arm assembly 14 and a second clamping arm assembly 16 disposed opposite one another. The first clamping arm 14 consists of a longitudinally elongated first beam 18 which has a longitudinal axis 20. A grapple fixture 22 is located at the proximal end of the beam 18 for connection with a grapple device of a manipulator arm. The grapple fixture and its associated grapple device of the grapple arm may be constructed in accordance with that described in U.S. Pat. No. 4,105,241, Henry J. Taylor et al. The longitudinally elongated beam 18 has a cylindrical housing 24 located inwardly from the distal end thereof and a pair of transverse beam members 26 project laterally outwardly therefrom. A first clamping face 28 (FIG. 3) is formed by the upper edges of the longitudinally elongated beam 18 and the transverse beams 26. The first clamping face 28 is disposed in a first plane which is substantially parallel to the longitudinal axis 20. A spin-up drive mechanism generally identified by the reference numeral 30 is mounted in the tubular housing 24 and has a splined drive shaft 32 mounted for rotation on a spin-up axis 34 which extends perpendicular to the first clamping plane 28 and the longitudinal axis 20. In addition to being rotatable, the spin-up drive shaft 32 is movable longitudinally of the spin-up axis 34 between a lowered position disposed below the first clamping face 28 and a raised position projecting above the first clamping face 28. Four brake pads 36 are mounted in recesses formed in the first clamping face 28 for movement between the extended position projecting above the first clamping face 28 and the retracted position located below the first clamping face 28.

Figure 5:
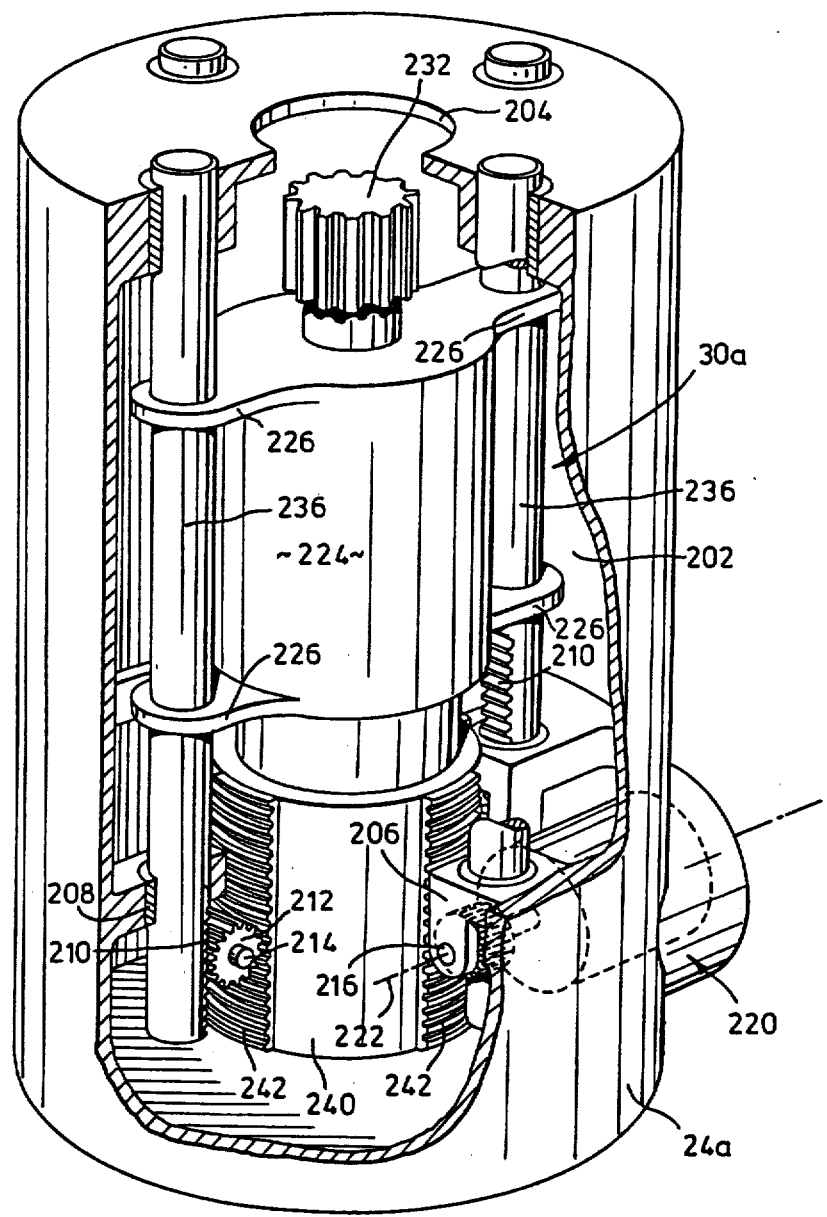
FIG. 5 is a partially sectioned pictorial view of a drive mechanism suitable for use in driving the spin up mechanism and brake pads.

A mechanism suitable for controlling the spin-up function and the extension and retraction of the brake pads is illustrated in FIG. 5 of the drawings in which the reference numeral 24A refers generally to a housing similar to that identified by the reference numeral 24 in FIG. 1. The housing 24A has a hollow chamber 202 formed therein. Passage 204 opens from the chamber 202 through the upper wall of the housing 24A. Four lugs 206 project inwardly from the sidewall of the housing to 24A adjacent the lower end of the chamber 202. Each of the lugs 206 supports a bush 208 within which a brake pad column 236 is slidably mounted. Each column 236 has a toothed rack 210 formed at its lower end. Pinions 212 are rotatably supported by the lugs 206 by shafts 214 which are mounted in passages 216. An extend/retract drive motor, generally designated by the numeral 220, has an output drive shaft coupled to the shaft 214 with which it is aligned on the axis identified by the reference numeral 222 such that, by operating the motor 220, the pinion which is mounted for rotation of the axis 220 is positively driven.

The spin-up drive motor 224 has lugs 226 projecting laterally therefrom which are slidably mounted on a pair of the brake pad columns 236. The spin-up drive motor 224 also has a cylindrical extension 240 at the lower end thereof on which four sets of toothed racks 242 are formed, one for engagement with each pinion 212.

In use, the splined end portion 232 of the spin-up drive shaft is rotatably driven by the spin-up motor 224.

The splined end portion 232 can be moved to a position in which it projects from the housing through the passage 204 simultaneously with the retraction of the brake pads which are located at the upper end of the columns 236 by activating the motor 224 to rotatably drive the sprocket 212 to which it is positively connected for rotation about the axis 220. It will be apparent that if one of the sprockets 212 is rotatably driven, the toothed rack 210 which is formed on each column 236 will be driven in a direction opposite to the direction in which the toothed racks 242 which are formed in the lower portion 240 of the housing 224. Thus, by rotatably driving the pinions 212 in one direction, the brake pads formed at the upper end of the brake pad columns 236 can be retracted while the spin-up drive shaft 232 is extended with respect to the housing 24A and by reversing the direction of rotation of the motor 220, the brake pads can be extended while the spin-up shaft is retracted. It will also be noted that the outer ends of the brake pads and the outer end of the spin-up drive shaft 232 are arranged with respect to one another such that during extension and retraction, an intermediate position is provided wherein both the brake pads and the spin-up shaft are located at or below the first clamping face 28.

A suitable extension and retraction mechanism is provided so that the braking pads may be moved to their extended position when a braking action is required and may be moved to their retracted position when the spin-up drive shaft is activated to impact a launch spin to the satellite in use. The mechanism for raising and lowering the brake pads may be coupled to the mechanism for raising and lowering the spin-up drive shaft so that the brake pads are raised when the drive shaft is lowered and the brake pads are lowered when the spin-up drive shaft is raised.

An elevator mechanism 40 served to connect the first clamping arm 14 and the second clamping arm assembly 16.

The elevator mechanism 40 has its first end 42 pivotally connected to the first clamping arm 14 inwardly from the first clamping face 28. The second end 44 of the elevator mechanism 40 is pivotally connected to the proximal end 46 of the second clamping arm assembly. The elevator mechanism 40 is in the form of an extensible articulated arm constructed as described in co-pending patent application Ser. No. 009,378 filed Feb. 21, 1979.

The elevator mechanism includes a first arm 48 which, as previously indicated, has its first end 42 connected to the beam 18. The second end of the arm 48 is connected to an elbow member 50. The second arm 52 has one end connected to the elbow 50 and its other end connected at 44 to the proximal end 46 of the second clamping arm assembly 16. An elevator drive motor 54 is housed within the beam 18 and is drivingly connected to the first arm 48 of the elevator mechanism for driving the first arm 48 about its pivotal connection with the beam 18. Rotation of the first arm 48 about its pivotal connection with the beam 18 causes the second end 44 of the elevator mechanism to move vertically with respect to the first end 42 so as to raise and lower the proximal end 46 of the second clamping arm assembly 16. The mechanism for effecting the linear movement of the opposite ends of the elevator mechanism is, as previously indicated, fully described in co-pending application Ser. No. 009,378 filed Feb. 21, 1979 the specification of which is incorporated herein by reference.

The second clamp arm comprises a pair of second beam members 60 which are pivotally mounted at their proximal end on the proximal end member 46 for rotation about axes 62. A scissors drive motor 64 is connected through a power transmission gearing housed within the proximal end member 46 to each of the second beams 60 for rotatably driving the second beams 60 about the axes 62 in a scissors like action between the clamping position shown in solid lines in FIG. 1 and the deploy/capture configuration shown in broken lines in FIG. 1. A clamping beam 66 is pivotally mounted on support brackets 68 located at the distal end of the second clamping arms 60. The clamping beams 66 have clamping faces 70 arranged to be disposed opposite the first clamping face 28 of the first clamping arm when the second clamping arms are disposed in the clamping configuration. The elevator mechanism 40 is operable to move the second clamping faces 70 towards and away from the first clamping face 28.

Figure 2:
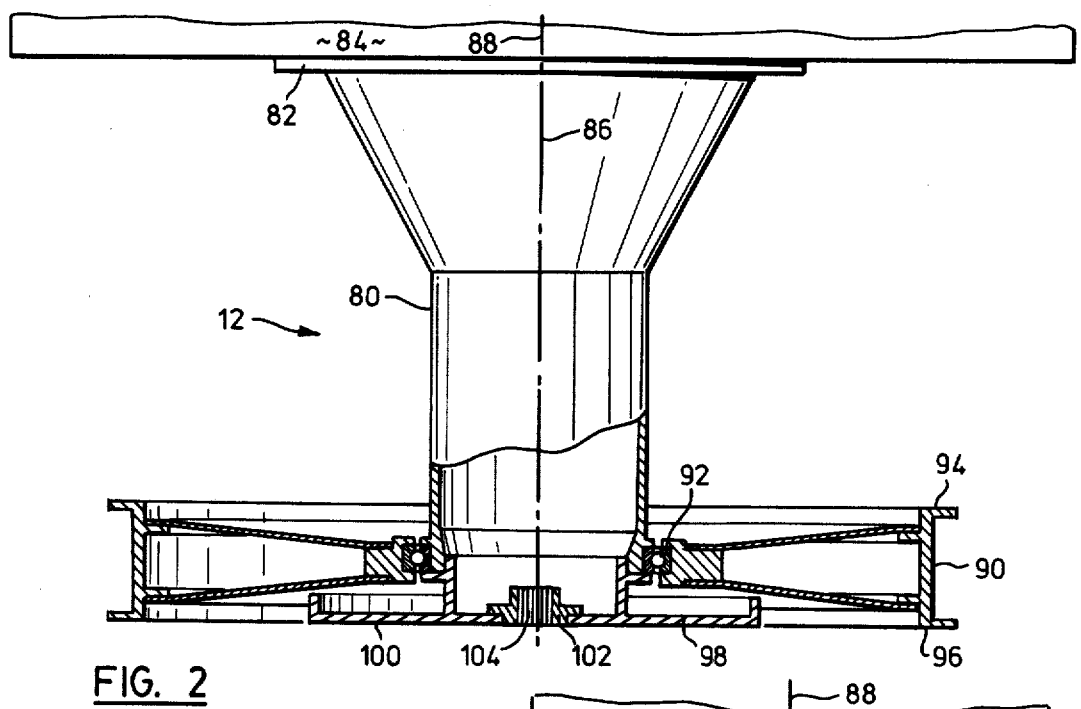
FIG. 2 is a partially section side view of an adaptor mounted on a satellite structure.

Referring now to FIG. 2 of the drawings, it will be seen that the adaptor 12 includes an adaptor housing 80 having a flange 82 at its proximal end connectable to a satellite structure 84. The housing 80 is connected to the satellite structure 84 with longitudinal axis 86 of the housing axially aligned with the longitudinal axis 88 of the satellite structure, the longitudinal axis 88 of the satellite structure being the axis about which the satellite spins when it rotates in orbit. The housing 80 has a passive turntable 90 which is mounted at the distal end of the housing 80 on the bearing 92 for free rotation about the longitudinal axis 86. The passive turntable 90 has upper and lower clamping faces 94 and 96 extending in spaced parallel clamping planes. A brake disc 98 is rigidly secured with respect to the housing 80 at the distal end thereof. The brake disc 98 is circular and has an annular braking face 100 projecting radially outwardly from the longitudinal axis 86 in the plane of the lower clamping face 96. The brake disc 98 is rigidly secured with respect to and rotates with the housing 80 about the longitudinal axis 86 so that a braking torque applied to the brake disc may serve to brake the rotation of the satellite 84 about the satellite axis 88. A collar 102 is located centrally of and is secured with respect to the brake disc 98. The collar 102 has a splined spin-up passage 104 located centrally thereof on the longitudinal axis 86. The splined passage 104 is adapted to slidably receive the spin-up drive shaft 32 as will be described hereinafter.

In use, the end effector 10 is secured to the end of a manipulator arm by means of the grapple fixture 22 as previously described. The brake pads and spin-up shaft are located in the intermediate position below the clamping face 28. The scissors drive motor 64 is activated to move the second beams 60 to the retracted position shown in broken lines in FIG. 1 and the elevator mechanism is moved to its lowered position in which the arms 48 and 52 are located in a closely adjacent side-by-side relationship. It will be noted that the slot 51 in the elbow member 50 enables the elevator mechanism to be retracted to a position in which the arm 44 extends parallel to the longitudinal extent of the beam 18 when in the retracted position as it permits the elbow member 52 to straddle the beam 18. The manipulator arm is activated in order to locate the first clamping face 28 in close proximity to the lower clamping face 96 of the turntable 90 of a spinning satellite 84. It will be noted that in an initial capture procedure, it is not necessary to accurately align the spinning axis 88 of the satellite and the spin-up axis 34 of the first clamping arm. After substantially aligning the first clamping face 28 and the clamping face 96 as described above, the elevator mechanism 40 is activated to raise the second clamping arms so that the second clamping faces 70 are disposed in a plane spaced above the plane of the clamping face 94 of the turntable. The scissors drive mechanism 64 is, then, activated to move the second clamping arms 60 from the retracted position shown in broken lines in FIG. 1 to the extended position shown in solid lines in FIG. 1. The elevator mechanism 40 is, then, activated to lower the second clamping face 70 of the second clamping arms toward the first clamping face 28 to the position shown in FIG. 3 of the drawings to clamp the clamping faces 94 and 96 of the turntable 90. The elevator mechanism 40 moves the clamping face 70 toward the clamping face 28 to engage the clamping faces 94 and 96, respectively. The motor 220 is then activated to move the brake pads 36 toward the extended position to apply a braking torque to the brake disc 98 which brings the rotation of the satellite 84 about its axis 88 to a halt. Thus, the end effector and adaptor housing cooperates with one another to provide a coupling for connecting a satellite to an adaptor arm and a braking mechanism for arresting the rotation of the satellite.

As previously indicated, it is also necessary to make provision for the launching or return of a satellite to orbit. Having once captured a satellite, it is possible by manipulation of the manipulator arm and the clamping mechanism to accurately align the axis 86 of the adaptor housing 80 and the spin-up axis 34 of the spin-up drive mechanism. Having thus aligned the spin-up drive shaft 32 with the spin-up passage 104, it is possible by activating the motor 220 to drive the splined drive shaft 232 longitudinally of itself into drivingly engagement with the splined passage 104 while simultaneously retracting the brake pads 36. Having retracted the brake pads 36, the spin-up drive shaft is rotatably driven by activating the motor 224 to impart a rotation to the brake disc 100 and the housing 80 to which it is drivingly connected. Thus, the satellite 84 is rotatably driven about the satellite axis 88 while the passive turntable 90 remains secured with respect to the clamping mechanism. The manipulator arm may, then, be moved to the required launch location and the satellite released merely by moving the clamping faces 70 away from the clamping faces 28 and thereafter moving the second support means 60 to the position shown in broken lines in FIG. 1 by activating the scissors drive mechanism 64.

Figure 4:
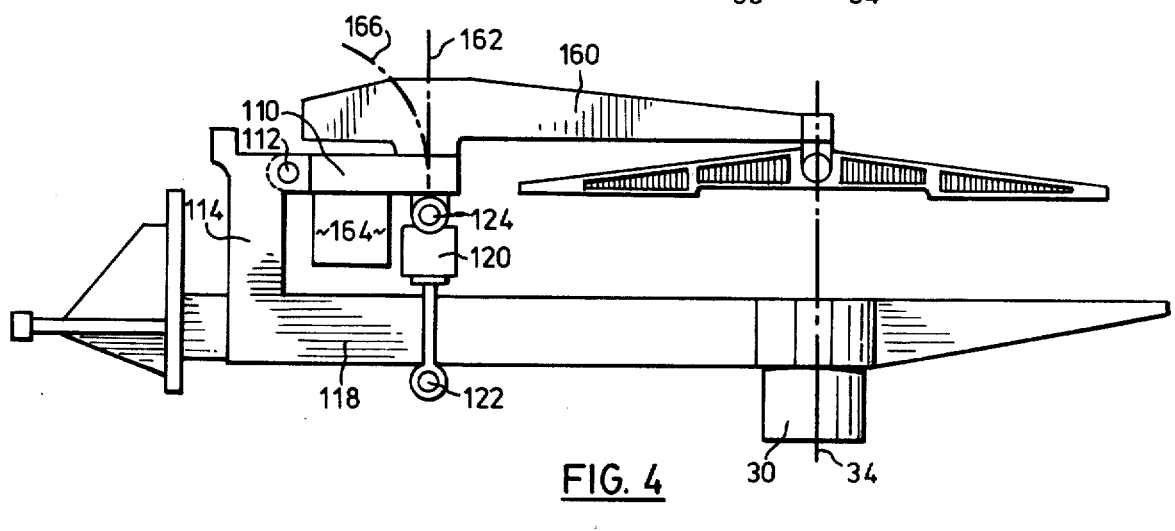
FIG. 4 is a side view of an adaptor constructed in accordance with a further embodiment of the present invention.

Various modifications of the present invention will be apparent to those skilled in the art without departing from the scope of the invention. One such modification is illustrated in FIG. 4 of the drawings wherein an alternative elevator mechanism is illustrated. In the embodiment, the elevator mechanism includes a lever arm 110 which is pivotally mounted at its proximal end for rotation about a pivot pin 112 which is carried by a support portion 114 which projects upwardly from the first clamping beam 118. An extensible solenoid 120 has one end secured at 122 to the beam 118 and the other end secured at 124 to the distal end of the lever arm 110. A pair of second beams 160 (only one of which is shown) are mounted for rotation about axes 162 on the lever arm 110 and a scissors drive motor 164 is drivingly connected to the arms 160 for rotatably driving them about the axes 162. In this mechanism, the movement of the distal end of the lever arm 110 follows an arc of curvature 166 when the solenoid 120 is activated to raise or lower the clamping arms as required in use.

Various other modifications of the present invention will be apparent to those skilled in the art.

What I claim as my invention is:

1. A coupling system for capturing, braking and deploying an object which rotates about a first axis prior to capture comprising:
an adaptor and an end effector,
said adaptor comprising;
(a) an adaptor housing having an adaptor axis, said adaptor housing being adapted to be mounted on said object with its adaptor axis aligned with said first axis,
(b) a passive turntable mounted on and carried by said adaptor housing, said passive turntable being free to rotate about said adaptor axis independently of said adaptor housing,
said end effector comprising,
(a) clamping means adapted to be movable between a capture/deploy position and a clamping position with respect to said passive turntable to receive and release said turntable when in the capture/deploy position and to prevent rotation of the turntable when in said clamping position,
(b) means for driving said clamping means between said capture/deploy position and said clamping position,
(c) brake means carried by said clamping means for applying a brake torque to said adaptor housing when said turntable is secured by said clamping means,
(d) spin-up drive means carried by said clamping means and adapted to engage said housing to cause the housing to be rotatably driven about said adaptor axis prior to deploying of said object in use.

2. A coupling system as claimed in claim 1 wherein said clamping means comprises:
(a) a first clamp arm having; a proximal end and a distal end, a longitudinal axis extending from the proximal end to the distal end, a first clamping face at the distal end, said first clamping face being disposed in a first plane which is substantially parallel to said longitudinal axis,
(b) expansible support means having a first and second end movable toward and away from one another between an extended and retracted position, said first end being mounted on said first clamping arm,
(c) a pair of second clamping arms each having a proximal end and a distal end, a second clamping face at the distal end of each of said second clamping arms, the proximal ends of said clamping arms being mounted on said second end of said support means, one on either side of said longitudinal axis, for movement relative to said first arm in a second plane which is substantially parallel to said first clamping plane, each second clamping arm being movable in said second plane between a first position in which its second clamping face is disposed opposite said first clamping face to a second position in which its second clamping face is remote from said first clamping face,
(d) first drive means for driving said support means between said extended and retracted position to release or clamp said passive turntable therebetween,
(e) second drive means for driving said second clamping arms between their first and second positions to clamp said passive turntable when in said first position and to permit separation of said adaptor and said end effector when in said second position.

3. A coupling system as claimed in claim 2 wherein said spin-up drive means is mounted on said first clamping arm, said spin-up drive means comprising a spin-up drive shaft having a spin-up axis of rotation perpendicular to said first clamping face and said longitudinal axis, means for driving said spin-up shaft axially along said spin-up axis between a retracted position disposed below said first clamping plane and an extended position projecting above said first clamping plane for engagement with said adaptor housing to rotatably drive it about said spin-up axis.

4. A coupling system as claimed in claim 3 including a plurality of brake pads on said first clamping arm at uniformly spaced intervals about said spin-up axis, said brake pads being movable relative to said first clamping face, means associated with said brake pads urging each pad to extend above said first clamping face to apply a braking torque to said adaptor housing.

5. A coupling system as claimed in claim 2 wherein said first arm comprises a longitudinally elongated first beam extending along said longitudinal axis from said proximal end to said distal end and transverse beam means projecting laterally from opposite sides of the first beam, said first beam and said transverse beam means having coplanar upper edges extending in said first plane and forming said first clamping face.

6. A coupling system as claimed in claim 2 including grapple fixture means at said proximal end of said first clamp arm for releasably securing said first clamp arm with respect to a support structure.

7. A coupling system as claimed in claim 2 wherein each of said second clamping arms comprises a second beam member having its inner end pivotally mounted at the proximal end of the clamping arms for rotation about a second axis which extends perpendicular to said first clamping plane, a clamping beam pivotally mounted at the outer end of each second beam for rotation about a third axis extending normal to said second axis and transversely of the longitudinal extent of said second beam, said clamping beam extending forwardly and rearwardly from said third axis and being pivotable about said third axis for alignment with said passive turntable in use.

8. A coupling system as claimed in claim 1 wherein a brake disc is mounted on said adaptor housing for rotation with the adaptor housing about said adaptor axis said brake means urging said brake disc, in use, to apply said braking torque to said housing as aforesaid.

9. A coupling system as claimed in claim 8 wherein said brake means comprises a plurality of brake pads on said first clamping arm adapted to releasably engage said brake disc.

10. A coupling system as claimed in claim 9 including means supporting said brake pads for movement between a retracted position spaced from said brake disc and an extended position engaging said brake disc when said passive turntable is clamped by said clamping means.

11. A coupling system as claimed in claim 1 including a spinner passage opening into said housing at the outer end thereof, said spinner passage being axially aligned with said adaptor axis and adapted to drivingly engage said spin-up drive means.

12. A coupling system as claimed in claim 1 wherein said passive turntable has oppositely disposed first and second turntable clamping faces projecting radially from said adaptor axis.

13. A coupling system as claimed in claim 1 wherein said adaptor further comprises a brake disc at the outer end of said housing projecting radially outwardly from said adaptor axis and wherein said brake means on said end effector includes brake pads selectively movable into and out of engagement with said brake disc when said passive turntable is clamped by said clamping means.

14. In combination an end effector and adaptor for use in releasably securing a satellite with respect to a manipulator arm of a service craft during servicing of orbiting space satellites which rotate about a satellite axis in use, said adaptor comprising:
 (a) a housing having an inner end and an outer end and an adaptor axis extending between the inner end and the outer end,
 (b) a spinner passage opening into said housing at the outer end thereof, said spinner passage being axially aligned with said adaptor axis,
 (c) a brake disc at the outer end of said housing projecting radially outwardly from said spinner passage.
 (d) a turntable mounted at the outer end of said housing for free rotation about said adaptor axis, said turntable having oppositely disposed first and second turntable clamping faces projecting radially from said adaptor axis and, said end effector comprising:
  (a) a first clamping arm having a proximal end and a distal end, a longitudinal axis extending from the proximal end to the distal end, a first clamping face at the distal end, and disposed in a first plane which is substantially parallel to said longitudinal axis so as to be locatable in a face-to-face relationship with said first turntable clamping face,
  (b) a spin-up drive means mounted on said first clamping arm, said spin-up drive means comprising a spin-up drive shaft having a spin-up axis of rotation extending perpendicular to said first clamping face and said longitudinal axis, said spin-up drive means including means for driving said spin-up shaft axially along said spin-up axis between a retracted position disposed below said first clamping plane and an extended position projecting above said first clamping plane for engagement with said spinner passage of an adaptor in use and means for rotatably driving said spin-up shaft about said spin-up axis to rotatably drive said adaptor and its associated satellite in use,
  (c) clamp actuator means having a first end and a second end and means for moving said first end and second end toward and away from one another, said first end being mounted on said first clamping arm between said first clamping face and the proximal end thereof,
  (d) a pair of second clamping arms each having a proximal end and distal end, a second clamping face at the distal end of each of said second clamping arms, the proximal ends of the second clamping arms being mounted on said second end of said clamp actuator means, one on either side of said longitudinal axis, for rotation about third axes which extend perpendicular to said clamping face, said second clamping arms being movable about said third axis between a first position in which the second clamping face of each second arm is disposed opposite said first clamping face to a second position in which said second arms are remote from said first clamping face,
  (e) said clamp actuator means being operable to move said second clamping arms relative to said first clamping arms to move said second clamping faces toward and away from said first clamping face to clamp or release said turntable as required in use,
  (f) retractable brake pad means on said first clamping arm at said first clamping face, said brake pad means being retractable below said first clamping face and extendable above said first clamping face to engage said brake disc and apply a braking torque thereto in use.

* * * * *